Sept. 19, 1967  H. NIERMANN ET AL  3,342,552
METHOD FOR PRODUCING PHOSPHOROUS PENTASULFIDE
Filed Jan. 31, 1964
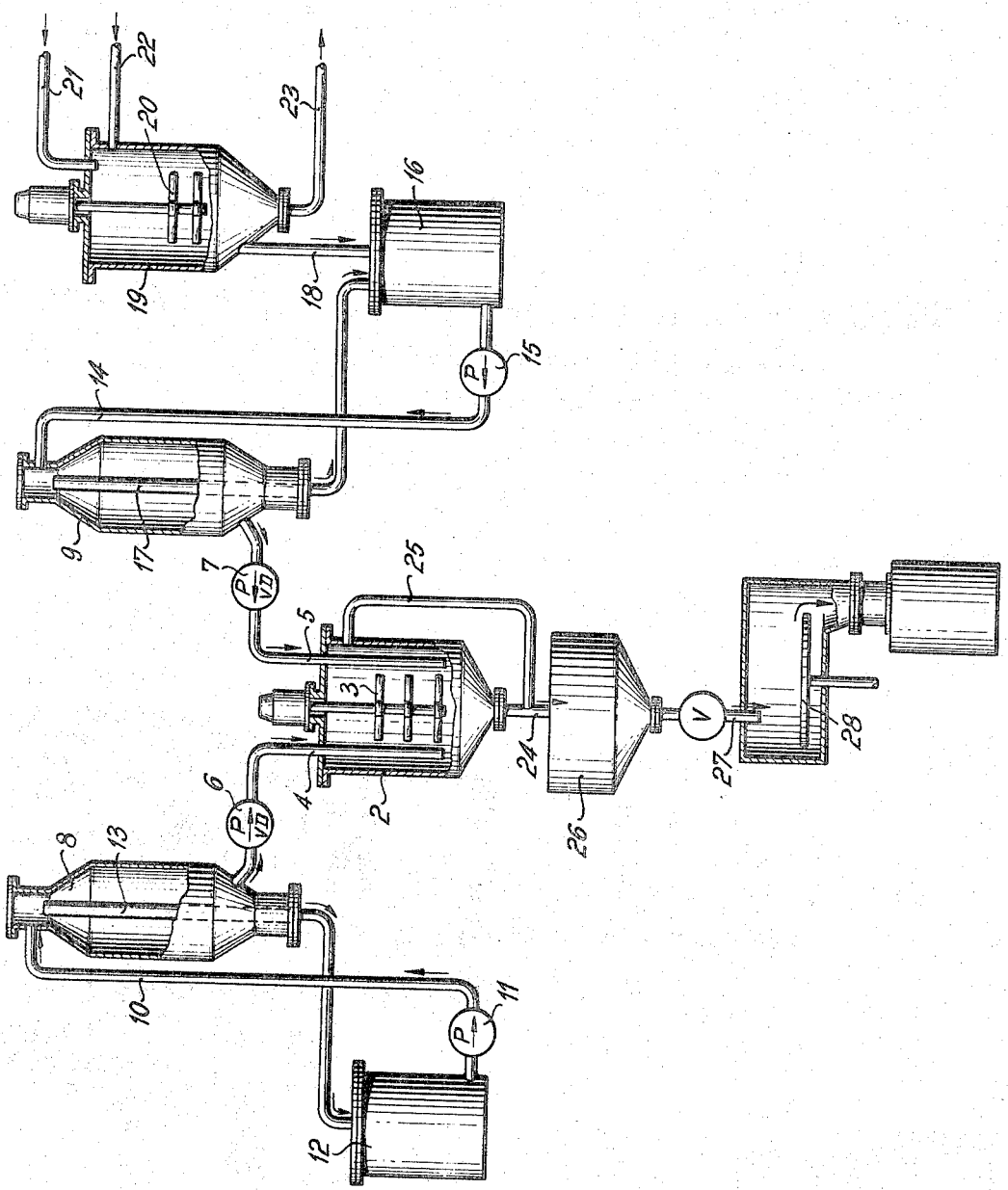

3,342,552
METHOD FOR PRODUCING PHOSPHOROUS PENTASULFIDE

Hermann Niermann, Bruhl, near Cologne, Heinz Harnisch, Lovenich, near Cologne, and Joseph Cremer, Hermulheim, near Cologne, Germany, assignors to Knapsack - Griesheim Aktiengesellschaft, Knapsack, near Cologne, Germany, a corporation of Germany
Filed Jan. 31, 1964, Ser. No. 341,635
Claims priority, application Germany, Mar. 23, 1963, K 49,315
8 Claims. (Cl. 23—206)

ABSTRACT OF THE DISCLOSURE

Method and apparatus for producing $P_2S_5$ by reacting liquid sulfur and phosphorus at temperatures above 250° C., the starting components being maintained in a proportion producing a reaction product having 28.1 to 28.9 percent phosphorus with the balance surfur, the sulfur being added in excess of the stoichiometric proportion until all the sulfur is introduced.

---

The present invention relates to a method of producing high-grade, high-purity phosphorus pentasulfide and to an apparatus for the carrying out of this process.

It is known that phosphorus sulfides and in particular phosphorus pentasulfide are produced by reaction of liquid sulfur with liquid yellow phosphorus. The reaction takes place exothermally and without difficulty above 250° C. Various methods of production are known, which are in part intermittent and in part continuous. In the continuous method, it is necessary by means of suitable apparatus to introduce phosphorus and sulfur in measured quantities simultaneously into the reaction vessel. Insofar as known, metering pumps and venturi flowmeters which operate with a precision of 1.5 to 2% are used for this.

The present invention provides a method which enables high-grade phosphorus pentasulfide to be produced with the use of metering devices which operate with particularly high precision.

The quality of a phosphorus pentasulfide can be determined for instance by the quantity of dimethyl dithiophosphoric acid which is produced upon the reaction of phosphorus pentasulfide with methanol, in accordance with the following equation:

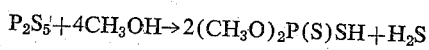
$$P_2S_5 + 4CH_3OH \rightarrow 2(CH_3O)_2P(S)SH + H_2S$$

This reaction, however, does not proceed entirely in the manner indicated. Depending on the quality of the phosphorus pentasulfide, varying quantities of polar and non-polar byproducts are produced. The quantity of dimethyl dithiophosphoric acid formed can be determined as cadmium, lead or copper salt.

It has now unexpectedly been found that the exact maintaining of the composition of the phosphorus pentasulfide—and this within very narrow limits—is of decisive importance for the quality of the phosphorus pentasulfide. Even deviations of 0.3% from the phosphorus content which leads to the best yields in the above control reaction result in definite losses in yield. The best yields are not supplied by products of the precise stoichiometric composition of $P_2S_5$ with 27.9% P, but rather those having a higher phosphorus content of about 28.1 to 28.9%, and preferably 28.2 to 28.4% P. Outside this range, the yield curves drop sharply.

Such an exact dosaging of phosphorus and sulfur could not be obtained with the known metering members, despite considerable efforts. If, on the other hand, one uses the storage vessel in accordance with the invention with its precisely defined volumes for phosphorus on the one hand and sulfur on the other hand and if this vessel is emptied and filled alternately, the above stipulated accuracy in the dosaging can be conveniently maintained even if standard commercial metering members, for instance pumps, are used for the emptying into the reactor. Care has merely to be taken that the storage vessels are completely emptied and/or filled to the full mark upon each stroke of this operating cycle, and that the number of strokes for phosphorus and sulfur is exactly the same over a given period of time.

The method can be carried out both intermittently and also with partial continuity. In the intermittent method sulfur and thereupon phosphorus are added into the reactor. In the partially continuous method, phosphorus and sulfur are added simultaneously into the reaction vessel which already contains a supply of liquid $P_2S_5$. In this connection, one can operate in such a manner that after each emptying of the storage vessel, the $P_2S_5$ formed is also expelled from the reactor, except for a residue required as liquid phase for the next reaction cycle. However, in order to increase the accuracy of the composition, the reaction volumes of several reaction cycles can be allowed to collect in the reactor and larger charges removed therefrom from time to time. Finally, with a sufficiently large reaction volume, the reaction product formed can be removed continuously from the reactor, for instance via an overflow, even during the adding of the starting materials. If, for instance, the reaction container has a capacity ten times the content of the overflow vessel, the error which as a result of false dosaging speeds can amount to at most 2%, is reduced in this case by the dilution in the large storage volume to 0.2%. If, furthermore, very long discharge times are used as compared with the times within which the overflow vessels are filled, then practically continuous operation associated with high precision of dosaging is assured. Finally, completely continuous operation is possible if one operates with several storage vessels for each of the starting materials. Within the time interval in which one overflow vessel containing phosphorus and one containing sulfur can empty themselves, others can be filled.

This type of continuous operation permits furthermore a methodology in the dosaging which cannot be obtained in case of continuous feeding by metering pumps. In this case one of the two reactants (phosphorus or sulfur) can be added more rapidly than the other while the phosphorus content of the entire mixture remains the same within narrow limits. It has surprisingly been found that it is favorable in the interest of a short reaction time to add the sulfur more rapidly. In such case, one always obtains in the primary reaction $P_2S_5$ and some excess sulfur which reacts with remaining phosphorus to form $P_2S_5$ with considerable evolution of heat of about 50 kilocalories per mol. If conversely the phosphorus is added more rapidly than the sulfur, one obtains primarily a mixture of low phosphorus sulfides, such as $P_4S_3$, $P_4S_7$, etc., which react further only reluctantly with the remaining sulfur with a considerably smaller amount of heat development. In the latter case, a considerable portion of the sulfur may remain as unbound sulfur in the phosphorus pentasulfide, which is undesirable.

In the following table, there are set forth the analytical values with respect to the P-content and the yields of dimethyl dithiophosphoric acid by reacting $P_2S_5$ with $CH_3OH$ in accordance with the equation given above for two commercial products and a product which was produced by the method of the invention:

|  | Commercial Product I | Commercial Product II | Product of the invention |
| --- | --- | --- | --- |
| P-content, percent | 27.9 | 28.0 | 28.2 |
| Yield, percent | 74.5 | 78.5 | 82.5 |

An apparatus for carrying out the method of the invention is shown in the accompanying drawing in the form of a flow sheet.

In this drawing, the reaction vessel for the production of $P_2S_5$ from phosphorus and sulfur is designated 2. This reactor 2 is provided with an agitator 3 and two feed lines 4 and 5 respectively for the liquid starting components sulfur 4 and phosphorus 5. These starting components are taken from the overflow vessels 8 for sulfur and 9 for phosphorus respectively by means of the metering pumps 6 and 7. The sulfur is fed to the sulfur overflow vessel 8 by means of the conveyor pump 11 from the storage container 12 via the line 10. In the storage container 8, there is an overflow line 13 through which excess sulfur is returned into the storage container 12 after always constant filling of the vessel. Similarly, the phosphorus is fed to the overflow vessel 9 via the line 14 by means of the conveyor pump 15 from the phosphorus storage container 16, in which case again any excess phosphorus flows back through the overflow line 17 from the overflow vessel 9 into the storage container 16 in order to thereby maintain a constant height of filling.

In front of the phosphorus storage container 16, there is provided a cleaning vessel 19, with agitator 20, to which the phosphorus is fed through the top line 21 and from which it is discharged via the discharge line 18 into the storage container 16. Sulfuric acid is fed to the cleaning vessel 19 via the feed line 22 and discharged again via the bottom discharge conduit 23.

The $P_2S_5$ formed in the reaction chamber 2 is removed through the bottom discharge line 24 or the overflow line 25, and fed to a storage vessel 26, through the bottom discharge line 27 of which, provided with a valve, the $P_2S_5$ passes to the revolving plate 28 from where it is fed to the further processing.

More particularly, the present invention is concerned with a method of producing phosphorus pentasulfide by reaction of phosphorus and sulfur at temperatures above about 300° C. and preferably with agitation, wherein the starting components, which are preferably in the liquid state, are fed from separate vessels, the full volumes of which are reproducible with extreme accuracy, for instance by means of an overflow, in such quantities to a reaction container that the reaction product has a phosphorus content of about 28.1 to 28.9% by weight and preferably 28.2 to 28.4% by weight, whereupon the completely emptied overflow vessels are again filled with the starting components whereas the phosphorus pentasulfide is removed from the reaction container and quenched. The reaction mixture in the reaction container is maintained by cooling at temperatures of about 350 to 480° C. and preferably 400 to 420° C. The starting components are preferably introduced in the vicinity of the bottom, i.e., into the sump of the reaction container.

In this process, one can operate intermittently and discharge the reaction product, after complete addition of the reaction components, only after a time of stay of between about 1 to 120 minutes and preferably between about 5 and 10 minutes, from the reaction container. It is more advantageous, however, to operate continuously, in which case the reaction product is withdrawn through an overflow from the reaction container.

The ratio of the useful volume of the reaction container to the sum of the filling volumes of the overflow vessels should be greater than 2 and preferably greater than about 4. Thus the sum of the filling volumes of the overflow vessels should be between 10 and 150 liters, and the volume of the reaction container between about 50 and 800 liters. The ratio of the emptying time to the filling time of the overflow vessels should be greater than 3 and preferably greater than about 8, i.e., the filling time of the overflow vessels is between about 1 and 10 minutes, and preferably between about 1 and 5 minutes, and the emptying time of the overflow vessels is between about 10 and 100 minutes, and preferably between about 15 and 60 minutes.

In the method of the invention, the sulfur may at least partially be introduced as the first component into the reaction container and the phosphorus then added. In accordance with a further concept of the invention, the starting components may also be added simultaneously, the speed of feed of the sulfur being advantageously adjusted greater than that of the phosphorus, so that after complete addition of the former, about 0.5 to 5% of the phosphorus must still be added.

Finally, several overflow vessels may advantageously be used for each starting component, the filling and emptying times of which are so adapted or shifted in time with respect to each other that the starting components are continuously fed into the reaction container.

The apparatus for carrying out the method of the invention consists of a reaction container 2 with agitator 3 and a feed line 4 for the sulfur and a similar feed line 5 for the phosphorus, these feed lines 4 and 5 preferably discharging in the vicinity of the bottom portion of the reaction container 2 which has a lower outlet line 24 or an overflow line 25 for the intermittent or continuous removal respectively of the reaction products into a storage vessel 26, and in which the feed lines 4 and 5 are connected via metering pumps 6 and 7, each with at least one overflow vessel 8 and 9 to which the starting components sulfur and phosphorus are fed from the storage containers 12 and 16 respectively via the pumps 11 and 15 respectively through the top lines 10 and 14 respectively, while excess starting components flow back through the central overflow lines 13 and 17 respectively into the storage containers 12 and 16 respectively, whereby reproducible filling volumes of the overflow vessels 8 and 9 are assured.

In front of the phosphorus storage container 16 there is connected a phosphorus purification vessel 19 with agitator 20 to which the phosphorus flows via the feed line 21, and the phosphorus, after it has been purified preferably with sulfuric acid, which is supplied via the line 22 and withdrawn through the bottom discharge line 23, is fed via the line 18 to the phosphorus storage container 16. The storage vessel 26 has a valve-controlled bottom discharge line 27 through which the phosphorus pentasulfide is withdrawn as the reaction product and conveyed for instance to a rotary plate 28 for quenching, from where it passes to further storage or use.

The following examples serve to illustrate the method of the invention:

Example 1

34.7 kg. sulfur are introduced into a reactor having a capacity of 60 liters and are heated to 300° C. Thereupon, 13.1 kg. phosphorus which are located in an overflow vessel are added with agitation during the course of a half hour. The temperature is maintained at 400 to 420° C. by suitable cooling. After addition of the phosphorus, the reaction mixture is maintained for a further 10 minutes at 400° C. and then quenched in a cooling device.

The final product obtained has a content of 28.1% by weight phosphorus and 71.7% by weight sulfur. The yield of dimethyl dithiophosphoric acid obtained by reaction with methanol is 80.0%, referred to the quantity theoretically obtainable.

Example 2

From an overflow vessel containing 34.7 kg. sulfur and another overflow vessel containing 13.1 kg. phosphorus, phosphorus and sulfur are caused to flow simultaneously via metering pumps into a reactor which is already one-third filled with liquid $P_2S_5$ having a temperature of 400° C. The sulfur is added in about 18.5 minutes and the phosphorus in about 22.5 minutes. The temperature is maintained by cooling at 400° to 420° C. After the addition of the phosphorus, the mixture is maintained for a further 5 minutes at 400° C. and then quenched in a cooling device.

The final product has a content of 28.2% by weight phosphorus and 71.5% by weight sulfur. The yield of dimethyl dithiophosphoric acid is 82.5%, referred to the quantity theoretically obtainable.

*Example 3*

From an overflow vessel which contains 4.15 kg. sulfur, the sulfur is pumped within 7.9 minutes to the reactor charged with 50 kg. of liquid phosphorus pentasulfide. At the same time, a metering pump feeds 1.57 kg. phosphorus within 8.2 minutes from another overflow vessel. These quantities are fed to the reaction mixture, which has a temperature of 400° C., in the vicinity of its lowest point. Corresponding quantities of phosphorus pentasulfied are removed from the upper part of the reactor by means of an overflow line. When the overflow vessels for sulfur and phosphorus are empty, they are filled within 1 minute and again discharged in the periods of time indicated into the reactor. The $P_2S_5$ formed is quenched on a cooling device.

The product has a content of 28.1% by weight to 28.3% by weight phosphorus and 71.4% by weight to 71.7% by weight sulfur. The yield varies between 81% and 84% of the quantity theoretically obtainable.

We claim:

1. A method for producing phosphorus pentasulfide by reacting phosphorus with sulfur which comprises introducing into a reaction zone at a temperature above 300° C. the phosphorus and the sulfur as the starting components in such a proportion that about 28.1 to 28.9% by weight of the phosphorus pentasulfied produced is phosphorus and the balance is sulfur, the said starting components being so introduced that an excess of sulfur over the stoichiometric proportion, referred to $P_2S_5$, is present during the reaction until all the sulfur has been introduced, the balance phosphorus being added subsequently, and removing the reaction product from the reaction zone and quenching.

2. A method as claimed in claim 1, wherein 28.2 to 28.4% by weight is phosphorus.

3. A method as claimed in claim 1, wherein the sulfur is first introduced at least partially into the reaction zone and the phosphorous then added.

4. A method as claimed in claim 1, wherein the starting components are simultaneously metered into the reaction zone, the sulfur being introduced at a feed velocity greater than that of the phosphorus so that after the addition of the sulfur is complete about 0.5 to 5% of phosphorus are required to be added subsequent to the sulfur addition.

5. A method as claimed in claim 1, wherein the starting components introduced into the reaction zone and forming the reaction mixture therein are maintained at a temperature of about 350 to 480° C. by cooling.

6. The method as claimed in claim 5, wherein the reaction mixture is maintained at a temperature of 400 to 420° C.

7. A method as claimed in claim 1, wherein operation is discontinuous and the reaction product is allowed after the addition of the starting components is complete to remain for a period of about 1 to 120 minutes in the reaction zone before it is removed from the said reaction zone.

8. The method as claimed in claim 7, wherein the reaction product is allowed to remain for a period of about 5 to 10 minutes in the reaction zone before it is removed therefrom.

References Cited

UNITED STATES PATENTS

| | | | |
|---|---|---|---|
| 2,569,128 | 9/1951 | Jones | 23—206 |
| 2,760,850 | 8/1956 | Lambert et al. | 23—285 |
| 2,794,705 | 6/1957 | Hudson | 23—206 |
| 2,824,788 | 2/1958 | Lefforge | 23—206 |
| 3,023,086 | 2/1962 | Robota | 23—206 |
| 3,167,398 | 1/1965 | Whittington | 23—285 |
| 3,183,062 | 5/1965 | Taylor | 23—206 |
| 3,205,041 | 9/1965 | Cremer et al. | 23—206 |

FOREIGN PATENTS

| | | |
|---|---|---|
| 492,848 | 5/1953 | Canada. |
| 3,045 | of 1902 | Great Britain. |

OSCAR R. VERTIZ, *Primary Examiner.*

MAURICE A. BRINDISI, *Examiner.*

J. J. BROWN, G. T. OZAKI, *Assistant Examiners.*